United States Patent [19]

Reuter et al.

[11] Patent Number: 4,542,652
[45] Date of Patent: Sep. 24, 1985

[54] METHOD AND APPARATUS FOR DETERMINING A RELATIVE DISTANCE IN A CYLINDER AND PISTON ASSEMBLY

[76] Inventors: Martin Reuter; Johannes König, both of Allacher Strasse 60, D-8047 Karlsfeld, Fed. Rep. of Germany

[21] Appl. No.: 561,588
[22] PCT Filed: Mar. 30, 1982
[86] PCT No.: PCT/DE82/00074
§ 371 Date: Nov. 30, 1983
§ 102(e) Date: Nov. 30, 1983
[87] PCT Pub. No.: WO83/03478
PCT Pub. Date: Oct. 13, 1983
[51] Int. Cl.⁴ ............................................. G01N 29/00
[52] U.S. Cl. ................................... 73/597; 73/119 R; 73/627
[58] Field of Search ...................... 73/597, 119 R, 627

[56] References Cited

U.S. PATENT DOCUMENTS 3,184,969 5/1965 Bolton .............................. 73/290 V
4,210,969 7/1980 Massa ................................. 367/108
4,254,660 3/1981 Prause ................................... 73/597
4,345,657 8/1982 Howard ............................... 73/597

FOREIGN PATENT DOCUMENTS 0037196 10/1981 European Pat. Off.

Primary Examiner—Howard A. Birmiel
Attorney, Agent, or Firm—McCormick, Paulding & Huber

[57] ABSTRACT

In the method and installation for determining a relative distance between the front wall (22) of the cylinder and the piston (14), an ultrasonic converter (30) is used to which a plate (68) presenting a reflecting reference surface (66) for the formation of a reference path is secured. The group of reference oscillations (R) and the group of measurement oscillations (M) appearing in the output signal of the converter (30) after the emission of a group of transmitter oscillations (S) are detected by means of threshold switches (108, 120, 122). Thereby, a measurement signal and a reference signal are obtained, the latter being used for compensation by means of a processor (38) for the influence of the different propagation conditions affecting the measurement signal.

11 Claims, 4 Drawing Figures

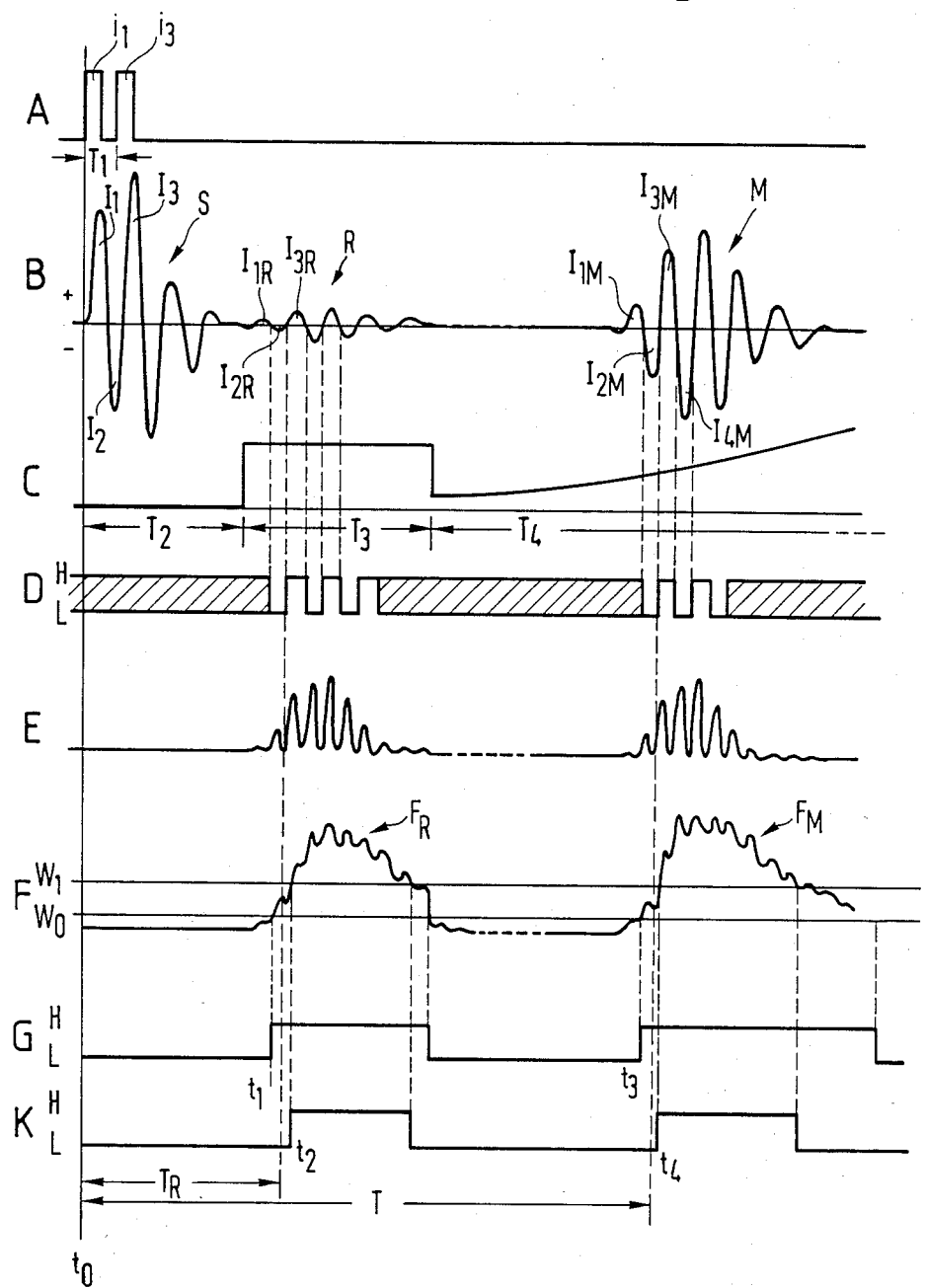

METHOD AND APPARATUS FOR DETERMINING A RELATIVE DISTANCE IN A CYLINDER AND PISTON ASSEMBLY

FIELD OF THE INVENTION

The invention comprises a method for determining the relative distance between a piston and cylinder in a piston and cylinder assembly which is provided with a chamber that is filled with a flowable medium, the walls of the cylinder and the piston forming the chamber. The invention further comprises the apparatus for accomplishing a method of this type.

BACKGROUND OF THE INVENTION

Methods and apparatuses of the above-referenced type are well known. For example, a measuring rod extending through the cylinder head wall is moved with the piston, and the position of the rod is detected capacitively or resistively. It is also possible to drive an electro-optical sensing device from the piston rod through a transmission device. Such a method requires large free space and substantially structural expense. Other well known distance measuring methods are unsuited for the determination of the relative distance between the piston and cylinder head of the assembly because the necessary measuring devices are too sensitive. Excluded equipment, for example, includes forklifts with hydraulically operated lifting forks, earth-moving equipment with hydraulically adjustable shovels, hydraulically operated extrusion presses, and many other applications of piston and cylinder assemblies for which there is no satisfactory device to exactly determine the relative positioning.

SUMMARY OF THE INVENTION

It is a principal object of the present invention to provide a method which constitutes an improvement over the prior art mentioned above, which can be accomplished at minimum expense and which delivers precise measuring results. It is a further object to provide a corresponding apparatus that is built with a minimum size at minimum expense and which operates precisely and reliably.

These objects are achieved according to the present invention in a method of the type described above in which a group of sequential ultrasonic oscillations are transmitted from a first end wall of the cylinder chamber and after reflection in the region of the oppositely disposed second end wall, the group received as a group of measurement oscillations. The elapsed time of the measurement oscillations between the transmission of the group of ultrasonic oscillations and the receipt of the group of measurement oscillations is utilized as a measure of the relative distance. A fluid medium extends along a reference path of a prescribed length and at the first end of the path, the group of ultrasonic oscillations are transmitted and after reflection at a reflecting reference surface forming the second end of the reference path, the group of oscillations are received again as reference oscillations. Through the measurement of the actual elapsed travel time between the transmission of the group of ultrasonic oscillations from the first end and the receipt of the reference oscillations, a proportional reference signal is produced, and the measurement signal obtained on the basis of the elapsed time measurement of the group of measurement oscillations is modified in response to the reference signal in the sense of a compensation for the influence of changes in the ultrasonic propagation conditions affecting the measuring signal.

Another object of the invention is to provide an apparatus for accomplishing the method. Embodiments of the method and correspondingly the apparatus are given in the following specification and claims.

According to the method and the apparatus of the present invention, a group or packet of sequential ultrasonic oscillations are transmitted from one end of a cylinder chamber, are reflected at the oppositely disposed end, and then are captured again at the first end. The travel time is a relatively accurate measure of the distance between the oppositely disposed ends, and accordingly, the distance between a piston and cylinder. Since the travel time for the ultrasonic oscillations in the cylinder chamber is always dependent upon the propagation speed of the ultrasonic waves in the fluid medium filling the cylinder chamber, and the time changes with temperature, pressure, and the chemical composition of the medium, specific measuring errors can accordingly be compensated for, whereby a reference signal is produced by means of a reference path and the signal is combined with the measurement signal produced by the elapsed time of the group of measuring oscillations as a correction. The only device necessary for transmission and reception of a group of ultrasonic oscillations for measurement of the travel time of the group of measuring oscillations, and if desired, also the simultaneous measurement of the actual reference travel time is a simple converter which does not enlarge the size of the piston cylinder assembly, and the required electrical switching components for exciting the converter and detecting the output signal from it. Such components and converter are relatively inexpensive and can easily be mounted at a suitable position which will not lead to a structural enlargement of the machine or, for example, the hydraulic system, in which the piston and cylinder assembly is employed.

BRIEF DESCRIPTION OF THE DRAWINGS

The invention is further described below with the aid of the following drawings in which the an exemplary embodiment is illustrated.

FIG. 4 is a timing diagram for explaining the operation of the detection circuitry in FIG. 3.

DESCRIPTION OF PREFERRED EMBODIMENTS

Figure 1:
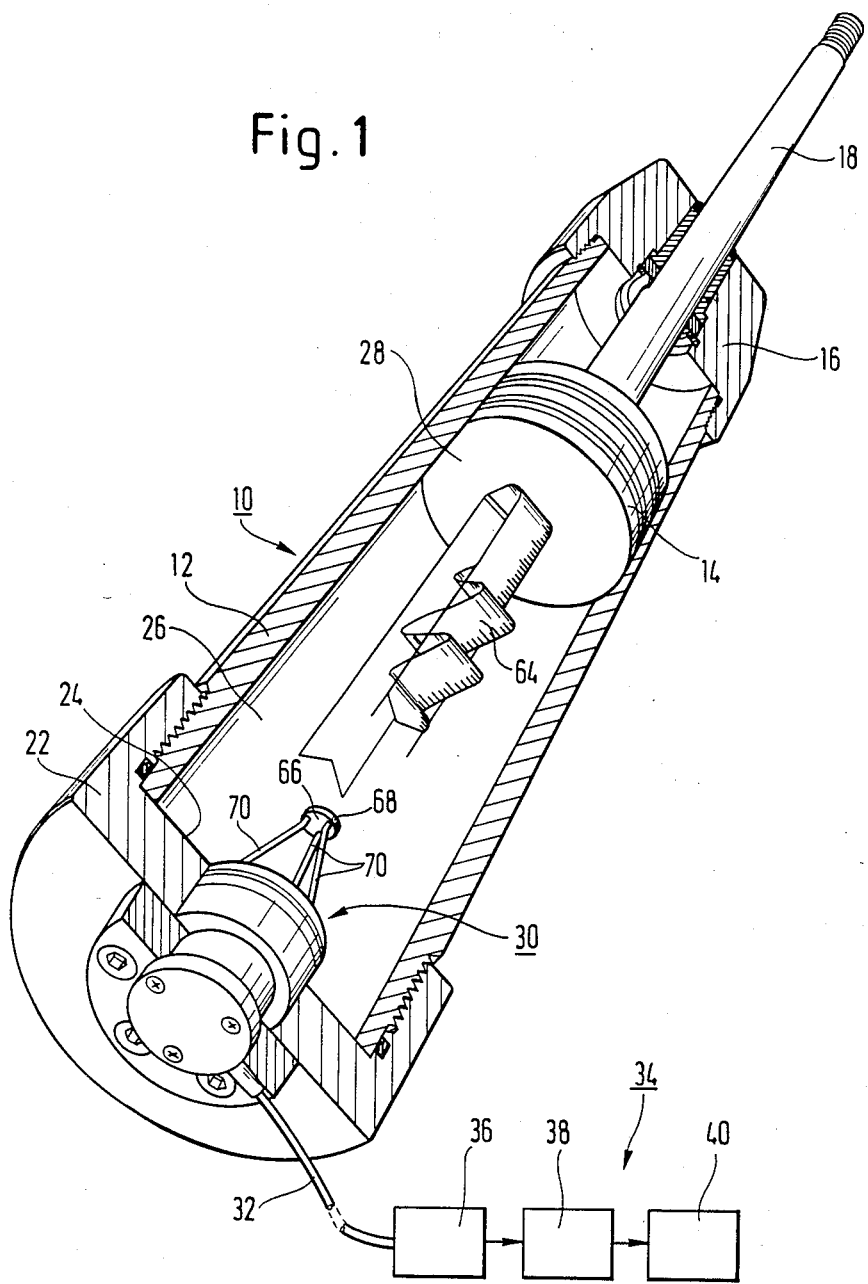
FIG. 1 shows a piston and cylinder assembly and distance measuring apparatus according to the present invention. The piston and cylinder assembly and the converter of the distance measuring apparatus are shown in perspective, the remaining parts of the distance measuring apparatus in contrast being illustrated schematically in block diagram.

FIG. 1 illustrates a piston and cylinder assembly 10 of a hydraulic system with the valves and manifolding omitted for simplicity. The assembly includes a cylinder 12, a longitudinally reciprocated piston 14 and a piston rod 18 extending through an end wall of the cylinder 12.

A further end wall 22 of the cylinder 12 forms at its inner side the first end 24 of the cylinder chamber 26 opposite the piston rod, the second end 28 of which is located on the piston 14.

By way of example, for controlling the position of the tool driven by the assembly 10 or a machine part or the output speed of a quantity of material from a pressure chamber having a pressure piston driven by means of the assembly 10, the relative distance between the cylinder 12 and the piston 14 is continuously determined as the actual distance and then, through subtraction of known values or time differentiation to provide an actual speed value and so forth, additional desired values can be derived. For determining the relative distance between the piston 14 and cylinder 12, an electrical ultrasonic generator or converter 30 is positioned in the end wall 22 or in other possible embodiments, at least in the vicinity of the first end face 24. The converter 30 is connected by means of a cable 32 with a detection circuitry 34. The latter is comprised in one embodiment by an input/output device 36, a processor 38 and a data output device 40, which may be an indicating device calibrated in units of length or a printer.

Figure 2:
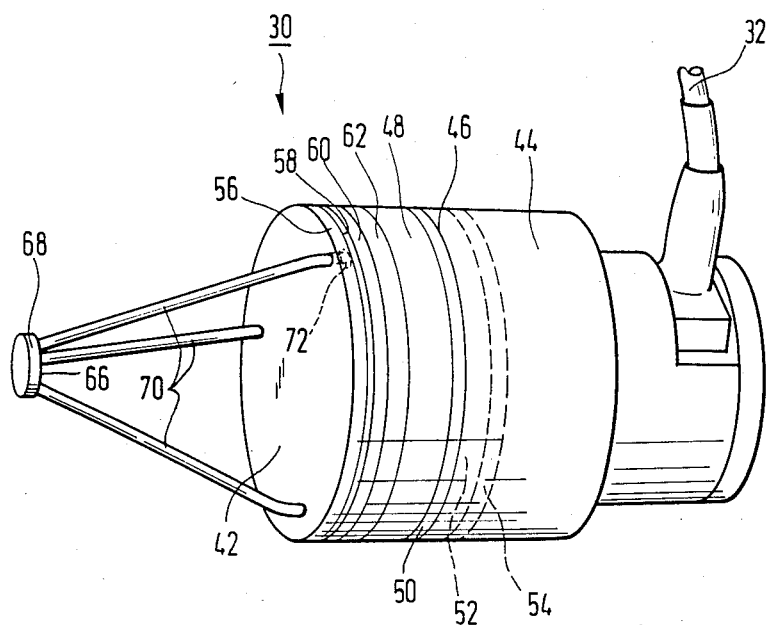
FIG. 2 is a side elevation view in perspective and shows the converter of the distance measuring apparatus in FIG. 1.

The converter 30, further illustrated in FIG. 2, is formed and positioned so that it generates a group of ultrasonic oscillations in the direction of the second end wall 28 when stimulated at least by electrical impulses, and upon impacting of ultrasonic oscillations, the converter produces a corresponding electrical output signal. The converter 30 has essentially a cylindrical shape forming a flat ultrasonic reflective surface 42 with the end wall of the cylinder associated with second end wall 28 of the chamber 26 which is in contact with the flowable medium in the cylinder chamber 26. A carrier 44 is formed from an incompressible material at the end of the converter 30 disposed oppositely from the ultrasonic reflective surface 42, and in a preferred embodiment, the carrier is composed of steel. The carrier 44 has a flat surface parallel to the beam reflecting surface 42, and in FIG. 2, the circumferential edge 46 of the surface is recognizable. Between the ultrasonic reflective surface 42 and the surface 46 lies a plate-shaped piezoelectric crystal 48 which is parallel to and spaced from each of the surfaces. The transducer 48 is comprised of a suitable ceramic material which is provided on each side with electrodes that are not visible. The thickness of the transducer is precisely a half wavelength of the ultrasonic oscillations and the ceramic material which has been selected for use, whereby the transducer establishes the frequency of the ultrasonic oscillations by which groups of sequential ultrasonic oscillations are transmitted from the converter 30. This frequency in one preferred embodiment is approximately 500 kHz. The diameter of the transducer 48 and the like diameter of the ultrasonic reflective surface 42 must be a multiple of the ultrasonic wavelength of such oscillations transmitted in the flowable medium; in the preferred embodiment, the referenced diameter is 20 millimeters.

In order for the oscillations 48 to be transformed into the greatest possible ultrasonic energy through energy received from electrical excitation pulses, and to be received by the converter 30 as the strongest possible reflected oscillations after reflection at the second end 28, and to be again transformed into an output signal, error compensation means are provided for wave resistance between the transducer 48 and the carrier 44, as well as means for wave resistance compensation between the transducer 48 and the ultrasonic reflective surface 42. Error compensation comes about essentially by intermixing layers which have strongly differentiated wave resistances relative to one another. The ultrasonic wave resistance of a layer depends essentially on the compressibility of the material and on the ultrasonic speed in the material. The wave resistance of the transducer 48 and the carrier 44 is relatively high, and for error compensation in a preferred embodiment, a quarter wavelength plate 50 is inserted between the two and made of a relatively incompressible material, such as an epoxy resin. As a quarter wave plate, a plate is illustrated in which the thickness comprises a quarter wavelength of the ultrasonic waves in the material of the plate at the described frequency of the transducer 48. If desired, additional plates can be provided between the transducer 48 and the carrier 44 with intermixed high and low wave resistances, for example, a quarter wave plate 52 made from steel and a further quarter wave plate 54 made from an epoxy resin, which the dotted lines indicate; the exposed upper surface of the carrier 44 associated with the transducer 48 would then lie adjacent the plate 54.

A wave resistance compensation means between the transducer 48 and the fluid medium in contact with the reflective surface 42 effectively produces a lessening of the wave resistance in the space between the transducer 48 and the reflective surface 42, and moves the resistance away from that of the transducer toward that of the compressible medium. Assuming that the fluid medium is an ordinary hydraulic fluid, the wave resistance of the epoxy resin is approximately twice that of the hydraulic fluid and the wave resistance of the common ceramic materials used in the oscillator 48 is approximately 20 times that of the fluid. For wave resistance compensation, more quarter wave plates are provided in the preferred embodiment; four plates 56, 58, 60, 62 lie next to one another relative to the oscillator 48, and they have a type of resistance selected so that they decrease in a manner corresponding to a stepped geometric sequence from the transducer 48 to the hydraulic fluid. The plate 62 is comprised of glass with a wave resistance approximately 15 times higher than that of the hydraulic fluid. The plate 60 is comprised of glass with a wave resistance approximately seven times higher than the hydraulic fluid.

The plate 58 is cut out of an ordinary circuit board that is comprised of glass fiber material with epoxy resin and has a wave resistance approximately four times higher than the hydraulic fluid. Finally, the plate 56 forming the ultrasonic reflective surface 42, as well as the plate 50, is composed from epoxy resin with a wave resistance approximately twice as high as the compressibility. All the plates, 56, 58, 60, 62 and possibly 52, 54, the transducer 48, and the cylindrical area of the carrier 44 adjoining the plates 50 or correspondingly the plate 54 are provided generally, in a manner not illustrated, with an epoxy resin coating which serves as a mechanical connector for these parts on their outer surfaces. At the same time, a connection of the transducer 48 and the plates 50, 56, 58, 60, 62 and if included 52 and 54, is produced by means of a thin adhesive coating that is not illustrated at their interconnecting adjacent surfaces.

By means of the converter 30, a group of successive ultrasonic oscillations are transmitted, controlled and partially detected through an input/output device 36 (FIG. 1). These ultrasonic oscillations extend for the most part to the second end wall 28 of the cylinder chamber 26 and there are reflected as indicated by means of the arrow 64 in FIG. 1. Insofar as the second end wall 28 is not even and does not extend perpendicular to the axis of the cylinder 12, a retro-reflector, a central tapered milled cut in the piston 14 with an equilateral-rectangular cross-section or an annular groove formed in the second end wall 28 with an equilateral-rectangular cross-section can be provided to permit the ultrasonic oscillations reflected in the region of the second wall 28 to be sent directly back in the direction of the converter 30. The transmitted group of ultrasonic vibrations travel back to the converter 30 as a measurement group with an elapsed travel time of the oscillations that is linearly proportional to the distance between the converter and the second wall 28. The group of reflected oscillations are received at the converter and are transformed into a group of measurement oscillations in the electrical output signal of the converter 30 and by means of the processor 38 serve the purpose of generating a measurement signal that is proportional to the relative distance being sought between the cylinder 12 and the piston 14. The signal can be displayed on the data output device 40.

Variations in the ultrasonic propagation conditions in the cylinder chamber 26 caused for example by variations in temperature or pressure of the fluid medium can produce errors in the received measuring signal. For compensation of certain variations of the measurement signal, the fluid medium is disposed along a reference path of prescribed length, at the first end of which a group of ultrasonic oscillations are transmitted and after reflection at a reference reflecting surface formed at the second end of the reference path, they are again received as a group of reference oscillations. By measuring the actual travel time elapsed between the transmission of the group of ultrasonic vibrations from the first end and the receiving of the reference group of oscillations, the reference signal proportional to such time is produced. The desired compensated signal is produced on the basis of the reference signal. If, for example, the measurement of the actual travel time amounts to 1.1 times the predetermined travel time of a temperature stablized quartz oscillator, it can be taken that the travel time of the group of oscillations associated with the measurement signal amounts to 1.1 times the correct travel time which corresponds to the real or actual relative distance. Wherefore the value of the received measurement signal must be divided by a factor of 1.1 in order to obtain a corrected measurement signal precisely proportional to the relative distance. This calculation of the compensation takes place in the processor 38.

Basically, the reference path can be located outside of the cylinder chamber 26 and remotely of the limited measurement path of the converter as long as it is guaranteed that the conditions along the reference path with regard to temperature, pressure, and physical-chemical composition of the fluid mediums also prevail in the cylinder chamber 26. So, for example, it may be useful to duct the hydraulic fluid from a plurality of parallel working piston and cylinders assembly through a common reference cylinder in which the reference path is formed in essentially the same manner as has been already described with the aid of FIG. 1 for the measuring path. This reference path comprises therefore a special converter for transmitting and receiving ultrasonic oscillations. For most applications, it is best with regard to both the construction costs and achievable accuracy of the desired compensation if the measuring path and the reference path are the same, as in the disclosed embodiment of the converter, because in the cylinder chamber 26, a fixed reference reflection surface 66 is provided at a minimal distance from the converter 30. The reference reflection surface 66 in the described embodiment of the converter is formed at the back side of a steel plate associated with the converter 30. The plate at its edge is secured to the converter 30 by means of three wires that form bows 70. The bows 70 project into the wave reflecting surface 42 near its outer circumference, penetrate the plate 56, and are soldered and held in solder holes 72 in the plate 58 as is indicated in FIG. 2. From the manufacturing standpoint, it is preferable that the plate 58 be cut from a material comprised of ordinary conductive platinum to produce a desired wave resistance. The solder holes or eyelets 72 can be formed in the customary simple manner and are then soldered. After soldering the bows 70, the plate 56 with its beam reflecting surface 42 can then be formed in a simple manner by pouring an epoxy resin over the ordinary component parts of the converter 30.

The distance of the reference reflection surface 66 from the beam reflection surface 42 of the converter 30 is in the preferred embodiment 40 millimeters, and at that value, is smaller than the smallest variable distance between the second end wall 28 and the first end wall 24 of the cylinder chamber. This dimension is established in order to not unnecessarily shrink or reduce the stroke of the piston 14 within the cylinder 12 on the one hand, and on the other hand, to permit firstly detection of a group of reference oscillations from the converter 30 after transmission of a group of ultrasonic oscillations and thereafter receipt of the group of measurement operations with clear differentiation, the group of measurement oscillations appearing in timed relationship with one another in the output signal of the converter. Further, the reference reflection surface 66 is essentially smaller than the beam reflecting surface 42. In the preferred embodiment, the relationship of the surfaces in three to four percent. In this manner, it is guaranteed that the largest part of the projected ultrasonic energy reaches the second end wall 28 of the cylinder chamber 26 and after reflection, gets back to the converter 30. Together with the properties established due to the construction of the converter 30, the electrical excitation pulses propagating without energy loss in the ultrasonic oscillations and reflected oscillations transformed into electrical output signals make it possible to receive groups of reference oscillations that are sufficiently large and suitable for precise compensation on the one hand, and on the other hand, make it possible to measure with great accuracy distances having magnitudes of up to 600 millimeters between the converter 30 and the second end wall 28.

In order that a group of reference oscillations reflected from the reference reflection surface 66 do not bounce back and forth again in the reference path after a signal or only insignificant resulting reflections at the beam reflection surface 42, that is, to avoid disturbing reference echos, it is useful to arrange the reference reflection surface 66 opposite a position parallel to the beam reflection surface 42 with slight tilt. In a preferred embodiment, the perpendicular to the reference reflection surface 66 assumes an angle of two degrees to the longitudinal axis of the cylinder 12 and is located concentrically with the axis of the converter 30.

Figure 3:
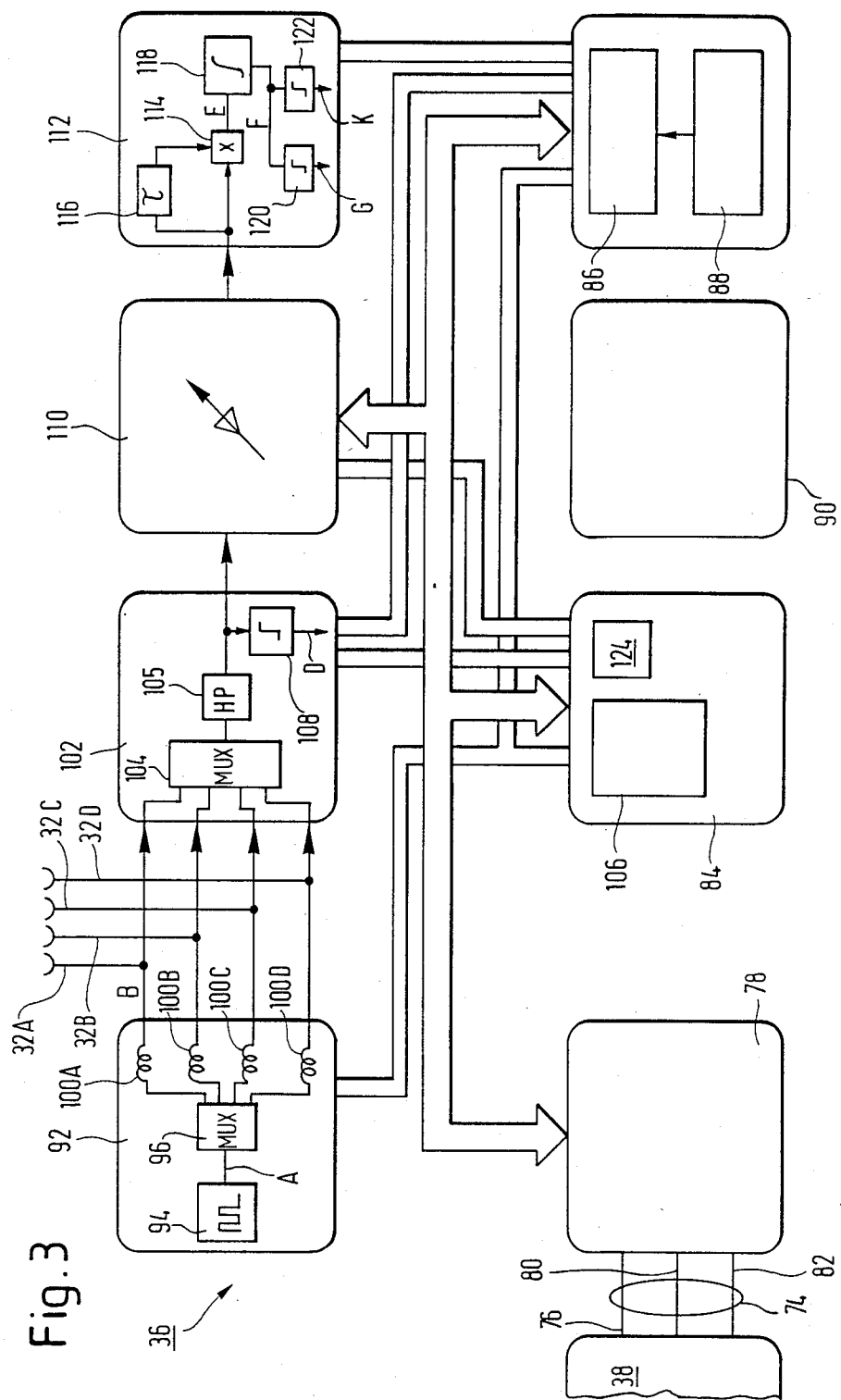
FIG. 3 is a somewhat detailed block diagram of the detection circuitry of the distance measuring apparatus in FIG. 1.

The construction of the threshold circuit 34 (FIG. 1) is further illustrated in FIG. 3. The processor 38 operates in dialogue with input/output device 36 through a connecting cable 74. The connecting cable 74 comprises a conductor 76 for the transmission of control bits from the processor 38 to a data coupler 78 of the input/output device 36, a conductor 80 for the transmission of eight data bits from the data coupler 78 to the processor 38, and a conductor 82 for the transmission of eight address bits between the processor 38 and data coupler 78 and back again. In regard to the measuring process taking place in the input/output device, the processor 38 has a special control function and an evaluating and in particular a calculating function while the programmed processing of the required individual instructions for measuring the travel time within the control results from a control unit 84 and a buffering of the data contained therein in a buffer member 86 within the input/output device 36. The actual data from the buffer memory together with a timing signal derived from the clock 88 are retrieved according to the commands from the buffer memory 86 and are transferred through the coupler 78 to the processor 38 in order there to compute the actual reference travel time, or the measurement oscillation travel time and a correction measurement signal whereby there transmissions to the processor 38 follow as permitted by the control due to an interrupt circuit 90. In this manner, for example, the transmission of a group of ultrasonic oscillations and the determination of the timing position of the group of measurement oscillations and the group of reference oscillations relative to the transmission is produced 250 times a second and the stored data obtained thereby can accordingly be transferred only one per second or up to 250 times a second to the processor 38 for evaluation to establish if the piston is stopped or moving and correspondingly causes no changes in the data or fast changes in the data.

The input/output device 36 comprises a sending unit 92 for producing a regulating pulse for four ultrasonic converters on conductors 32A–32D. In this manner, it is possible to carry out the measurement of the relative position of four piston and cylinder assemblies of the type illustrated in FIG. 1. The sending unit 92 comprises an electrical pulse generator 94 that actually produces two square wave pulses that are separated from one another for regulating a group of transmitted ultrasonic oscillations. The sending unit also has a multiplexer 96 connected to the pulse generator 94, and the outputs of the multiplexer lead to choke coils 100A–100D connecting downstream with the conductors 32A–32D. The coils 100A–100D actually form a resonant circuit with the associated converters 30 (FIGS. 1, 2) connected with the conductors 32A–32D. The resonant circuit is tuned to a desired frequency of the ultrasonic oscillations from the converter 30 in the preferred embodiment, for example, 500 Khz. The length and the timing interval of the square wave pulses produced by the pulse generator 94 are so tuned to the resonant frequency of said resonant circuit that these pulses from the regulator can be controlled with the strongest manner possible. The multiplexer 96 causes a switching of the conductors 32A–32D in a cyclic sequence.

To detect the output signals of the converter connected to the conductors 32A to 32D the conductors are also connected to a receiver 102 and in particular to the inputs of a multiplexer 104 provided therein. The multiplexers 96, 104 are controlled from a control register 106 provided in the controller 84, such that the input of the multiplexer 104 is closed initially upon receipt of a triggering pulse on an associated conductor, for example, the conductor 32A until the ultrasonic oscillations generated by the trigger pulse fade away, whereupon first the associated input of the multiplexer is opened in order to detect groups of reference and measuring oscillations appearing at the output of the connected converter on the conductor (in the example conductor 32A) for processing. Connected to the output of the multiplexer 104 is a high pass filter 105 which functions as a preamplifier with a second order high pass suppression and which has an output connected to the comparator 108. This comparator as described in further detail below serves to determine the zero crossing point marking the end of the actual reference travel time in a group of reference oscillations and for determining zero crossing point at the end of the travel time for the group of measurement oscillations.

The output signal of the high pass filter is directed either to the input of a comparator 108 or to an amplifier 110, the amplification of which is controlled by the controller 84, and a probability detector 112 is connected to the output of the amplifier 110. The signal input to the probability detector arrives at the input of a multiplier 114 and the input of a delay circuit 116, the output of which is the second input of the multiplier 114. The multiplier 114 and the delay circuit 116 essentially form a rectifying circuit, and in this embodiment a square circuit. Connected with the multiplier 114 is an integrator 118 serving as a zero error integrator. With a zero error integrator the output signal corresponds essentially to the integration of a variable input magnitude, and in the case of an input magnitude of null value, the output in general again assumes a null value with a relatively large time constant. Connected to the output of the integrator 118 are threshold detectors or switches 120, 122.

The operation of the detection circuit 34 (FIG. 1), is described below for the embodiment of FIG. 3 with the aid of FIG. 4. Accordingly, the triggering of the converter connected to the conductor 32A and the detection of its output signal are illustrated; triggering and detection of other converters connected to the conductors 32B to 32D are produced in a corresponding manner.

At the timing point $t_o$, the control register 106 causes the pulse generator 94 to start and the output of the generator is illustrated as curve A in the uppermost portion of FIG. 4. The impulse generator 94 produces two square pulses $i_1$ and $i_3$ with a period $t_1$ and with a pulse duration equal to half of the period.

The signals on the conductor 32A are illustrated as curves B in the second portion of FIG. 4. The pulses $i_1$, $i_3$ produced by the pulse generator 94 operate as trigger pulses for the group of transmitted oscillations with half waves $I_1$, $I_2$, $I_3$ . . . , since the conductance of the coil 100A together with the capacitance of the oscillator 48 (FIG. 2) in the converter 30 connected to the conductor 32A forms a resonant circuit excited by the impulses $i_1$, $i_3$. The period $T_1$ of the pulses $i_1$, $i_3$ is selected so that the second square wave pulse $i_3$ begins just as the second half wave $I_2$ of the group of transmitted oscillations S has reached its full amplitude. The group of transmitted oscillations S are prevented from reaching the switching components connected to the multiplexer 104 by the multiplexer itself; the multiplexer 104 joins its input connected to the conductor 32A initially with its own output when the group S of transmitted oscillations fades to zero, namely after a predetermined time period $T_2$ from the starting time $t_0$. Accordingly, the oscillations occurring in the output signal of the converter connected to the conductor 32A are processed through the multiplexer 104.

As shown in curve B, a group R of reference oscillations with half waves $I_{1R} I_{2R}$, $I_{3R}$ . . . appears in the output signal due to the reception of reflected ultrasonic oscillations from the reference reflection surface 66 (FIG. 2). Later, the group M of measurement oscillations with half waves $I_{1M}$, $I_{2M}$, $I_{3M}$ . . . appears in the output signal due to the reflection region at the second end wall 28 (FIG. 1).

The actual reference travel time is that travel time that is necessary for a particular transmitted half wave to again travel back from the converter 30 after reflection at the reference reflection surface 66 (FIG. 2). Thus, the actual reference travel time can be viewed, for example, as the time period between the zero crossing point between the second half wave $I_2$ and the third half wave $I_3$ of the transmitted group S of oscillations to the null crossing point between the second half wave $I_{2R}$ and the third half wave $I_{3R}$ of the group R of reference oscillations. In addition, the mentioned zero crossing point in the transmitted group S of oscillations can mark the beginning of the actual travel time and the mentioned zero crossing point in the group R of reference oscillations can mark the end of the actual travel time to be measured. Therefore, in the exemplary embodiment, the actual beginning of the travel time to be measured is not marked, but only the end of the travel time is marked in relation to the starting point $t_0$. Further, the processor 38 calculates a provisional value of travel time from which the actual travel time is determined through subtraction of a constant, since, for example, the zero crossing point between the second half wave $I_2$ and the third half wave $I_3$ of the transmitted group S of oscillations has a predetermined time position with respect to the starting point $t_0$. This type of travel time measurement with an arbitrarily marked beginning of the travel time is indeed valid for the measurement of the actual reference travel time $T_R$ as well as the travel time of the measurement oscillations T (FIG. 4 below).

The detection of the group R of reference oscillations and the group M of measurement oscillations results from the same elements of the detection circuit 34 in the exemplary embodiment of the invention. In particular, the marking of the end of the actual travel time to be determined, namely, the actual reference travel time $T_R$ or the travel time T of the measurement oscillations, is accomplished with the aid of the zero crossing of the trailing portion of a half wave and, to be sure, in the exemplary embodiment, the second half wave $I_{2R}$ of the group R of reference oscillations and the second half wave $I_{2M}$ of the measurement oscillations with the cooperation of the comparator 108 which represents a first threshold detector.

The output signal of the comparator 108 is illustrated in the fourth portion of FIG. 4 as curve D. In the crosshatched region, the output signal is not defined, nor is detection of any interest. In the region of the group R of reference oscillations and the group M of measurement oscillations, the output signal D varies or changes its logic condition (Low to High) at a zero crossing point of the group R of reference oscillations and correspondingly the group M of measurement oscillations.

The output signal D by itself would still not provide any information of when the end of the travel time T, $T_R$ to be measured should be marked, since it displays a plurality of changing conditions. One choice of these varying conditions makes it feasible for the comparator 108 to operate in a dynamic fashion, for a change in condition of the signal D from High to Low to take place with the changing of a positive half wave, for example, $I_{1R}$ to a negative half wave, in the example $I_{2R}$, and for a change in condition of the signal D from Low to High to take place with a change of a negative half wave to a positive half wave, for example, from $I_{2R}$ to $I_{3R}$. Thus, the approaching zero crossing point of the second pulse $I_{2R}$ or correspondingly $I_{2M}$ for the marking of the travel times $T_R$ or correspondingly T lies in the leading portion of the pulse appearing in the signal D. Therefore, additional means must be provided for establishing which of the leading portions occurring in the signal D is approaching for marking of the travel time. This comes about essentially through means for detecting the existence of the group R of reference oscillations and the group M of measurement oscillations in the output signal of the converter connected to the conductor 32A; if the presence of either the group R of reference oscillations or the group M of measurement oscillations is detected, then it can be stated or declared after the production of a corresponding signal, if it follows directly thereafter, that the second from the beginning of the signal or the third from the beginning or some other change in the signal D designates the zero crossing point being sought.

As a means for detecting the presence of the group R of reference oscillations or group M of measurement oscillations, it is basically sufficient to provide a second threshold circuit in parallel with the first threshold circuit—formed in the exemplary embodiment by the comparator 108 with a finite switching level which transmits an output signal and only if the output signal of the monitored converter exceeds a particular amplitude. The output signals of both threshold circuits can then be so interconnected that they together form a hysteresis amplifier of which the output signal then indicates only a particular change in condition (for example, the leading edge of a pulse) if a negative half wave exceeds a sufficient amplitude in a positive half wave. By this means, it can be established with relatively high certainty that the zero crossing point at the end of a second half wave $I_{2R}$ or correspondingly the zero crossing point at the end of the second half wave $I_{2M}$ with the measurement of the measurement oscillation travel time T. In the exemplary embodiment, another solution is actually selected in contrast to these other possible solutions, and although the selected solution requires a greater structural expense because of the presence of the amplifier 110 and the detector 112; nevertheless, it offers a particularly high assurance of an exact determination of the sought after zero crossing point.

In the third portion of FIG. 4, the amplification factor of the controllable amplifier 110 relative to its application is illustrated in curve C. During the time period $T_2$ in which the transmitted group S of oscillations is produced and fades away again, the amplification factor can basically be selected at any desired value since the multiplexer 104 does no permit the transmitted group S to pass through to the amplifier 110. Nevertheless, the degree of amplification during this period of time is purposely adjusted to avoid a drift at the null condition.

During the time period $T_3$ following this, the degree of amplification is adjusted to a relatively high, constant value. The time period $T_3$ forms the window in which the group R of reference oscillations occurs in each case when different actual reference travel times $T_R$ are produced due to various temperatures, pressure, and other conditions of the fluid medium in the cylinder chamber 26 (FIG. 1). The group R of reference oscillations is therefore amplified at a relatively high amplification factor in the amplifier 110. During the adjacent time period $T_4$ which terminates in a manner not illustrated prior to the starting point $t_0$ of the subsequent measurement, the amplification factor of the amplifier 110 increases upwardly in a manner corresponding to an exponential function. Bear in mind from this that the amplitudes of the group of measurement oscillations in the output signal of one converter decrease exponentially with the relative distance in corresponding travel time to be measured due to the housing in the fluid medium of the cylinder chamber 26 (FIG. 1), so that a compensation results in a manner such that in the output signal of the amplifier 110, the amplitudes of the group M of measurement oscillations are not dependent upon the fact that the actual travel time of the oscillations remains constant. The constnt amplification factor during the period $T_3$ is selected so that the amplitudes of the group R of reference oscillations amplified thereby are approximately equal to the corresponding amplitudes of the group M of measurement oscillations amplified in the previously described manner, and so that therefore at the output of the amplifier 110, for example, the amplitudes of the second half wave $I_{2R}$ of the group R of reference oscillations equal the amplitudes of the second half wave $I_{2M}$ of the group M of measurement oscillations, the amplified third half wave $I_{3R}$ has the same amplitude as the amplified amplitude of the third half wave $I_{3M}$, and so on.

The output signal of the multiplier 114 is illustrated as curve E in the fifth part of FIG. 4. Contrary to the alternating voltage of the above described reference and measurement oscillations in the output signal of the converter connected to the conductor 32A, the output signal of the multiplier is rectified and for this purpose is squared in the preferred embodiment due to the operation of the multiplier 114. The integrated result obtained at the output of the integrator 118 due to the integration of the signal is illustrated in the sixth portion of FIG. 4 as curve F, the two portions $F_R$ and $F_M$ corresponding respectively to the group R of reference oscillations and the group M of measurement oscillations.

The integrated results illustrated by the curve F and in particular the parts $F_R$ and $F_M$ provide an indication of the probability that an oscillation occurring on the conductor 32A is a group of reference oscillations or correspondingly a group of measurement oscillations, and that these groups were received without distortion and therefore are detectable. So, for example, reflections within the cyliner 26 (FIG. 1) can lead to a distortion or even a phase discontinuity in the group M of measurement oscillations whereby the amplitude of the part $F_M$ is essentially reduced. From experience, the first two half waves $I_{1M}$, $I_{2M}$ are at least affected by such distortions or phase discontinuities, and this establishes a reason for detecting the null crossing at the end of the second half wave $I_{2M}$, whereby a preference is established for the larger amplitude of the second half wave over the zero crossing point at the end of the first half wave.

The output signal of the threshold signals 120, 122 are illustrated as curves G, K in the two lower portions of FIG. 4. The threshold circuit 120 is triggered without hysteresis at a relatively low value of the integration value corresponding to a probability $w_0$. The threshold circuit 122 is triggered at a higher value of the integration result corresponding to a higher probability $w_1$, but this value is actually notably lower than the maximum values of the parts $F_R$, $F_M$. The smaller probability $w_0$ is reached at a point in time $t_1$ or correspondingly $t_3$ shortly after the beginning of the group R of reference oscillations or the group M of measurement oscillations respectively. The higher probability $w_1$ is exceeded at somewhat later times $t_2$ or $t_4$.

It has been shown that with a suitable choice of the probability $w_0$, the zero crossing point of the trailing edge of the second half wave $I_{1R}$ or correspondingly $I_{2M}$ always has a uniform timing position relative to the application of the signal to the threshold circuit 120 at timing points $t_1$ or $t_3$ respectively; with the selection of the probability $w_0$ set out in FIG. 4, the null crossing point being sought is that one which takes place as the first null crossing point after the times $t_1$, $t_3$. It is apparent that with selection of a higher value for the probability as the trigger point for the threshold circuit 120, for example, with an order of magnitude of a probability $w_1$ selected in the preferred embodiment, the null crossing point being sought can also be that one which lies timewise directly before the application of the signal to the threshold circuit 120 and even with selection of a detected null crossing point, the correspondingly detected change of condition in the signal D can also be the one after the timing point $t_1$ or $t_3$. In each case, however, with several successive changes in the condition in the output signal from the comparator 108 or correspondingly some other first threshold circuit, only that change in condition is effective for marking the end of the travel time $T_R$ or corresponding T which has a predetermined time position relative to the output signal of the threshold circuit 120. This time position can be established in a simple manner by means of suitable logic coupling means which can be provided at the input of the memory 86 or alternately in the processor 38.

The time interval $t_2 - t_1$ or correspondingly $t_4 - t_3$ which the threshold circuit 122 and the threshold circuit 120 correlate with the increase in probability at the beginning of the portions $F_R$ or correspondingly $F_M$ is a measure of how well the group R of reference oscillations or correspondingly the group M of measurement oscillations would be received without disturbance or distortion at least in regard to the two first half waves. If the time interval $t_4 - t_3$ is extended from an undisturbed condition, then it would lie at a distortion or damping of the group M of measurement oscillations whereby its detection would be made more difficult. In order to again establish detection of the time interval, the degree of amplification of the amplifier 110 is increased in this case, until the time interval $t_4 - t_3$ again has it original value. Thus results a regulation of the degree of amplification of the controllable amplifier 110 during the time period $t_4$ in the sense of a standardization of time interval $t_4 - t_3$. In a corresponding manner, regulation of the degree of amplification occurs in the time interval $T_3$ in the sense of a standardization of the interval $t_2 - t_1$, in order to guarantee the detectability of the group R of reference oscillations.

The regulation as described above is produced by suitable means in the processor 38. Fundamentally, it would be possible to set the degree of amplification of the amplifier 110 for each individual travel time measured on the basis of a few previously measured values of the time intervals $t_4-t_3$ and $t_2-t_1$. In the preferred embodiment, nevertheless, the basic time period is established qualitatively, as is illustrated in the curve C, by means of a suitable program control in the control unit 84, for example, by means of a subroutine program memory 124 in the control register 106. This has the advantage that the processor 38 only has to produce an adjustment of the degree of amplification with the larger time constants or, with the large opposing distances relative to the frequency of the travel time measurements, in which case, for example, the amplification values stored in the subroutines are multiplied with a suitable correction factor.

In the preferred embodiment, the operating time of the delay device 116 is selected such that the delay at the frequency of transmitted oscillations S equal to 500 kHz corresponds to a phase shift of a half wave length. By this means, the squaring circuit formed from the multiplier 114 and the delay member 116 immediately becomes a selective filter at the frequency of the transmitted oscillations. This contributes to the fact that shortly after the beginning of a group R of reference oscillations or a group M of measuring oscillations, the integrated result F provides an indication of whether these oscillations are not distorted in regard to frequency and phase relationship. Basically, however, it would also be possible to replace the multiplier 114 and the delay member 116 with a rectifier. Also, other variations in contrast to the described embodiment are understandably possible in the light of the patent claims.

We claim:

1. A method for determining the distance between a cylinder (12) and a piston (14) in a piston and cylinder assembly (10), which has a cylinder chamber (26) filled with a fluid medium and including end walls formed by the cylinder (12) and piston (14) comprising the steps of:

transmitting a group (S) of sequential ultrasonic oscillations from a first end wall (24) of the cylinder chamber (26) toward the second end wall (28) for reflection in the vicinity of the second end wall as a group (M) of measurement oscillations, the step of transmitting being performed by an ultrasonic converter supported at the first end wall (24) and including an incompressible carrier (44) having a flat surface (46), a plate-shaped piezoelectric oscillator (48) positioned parallel to the flat surface (46) and, in spaced relationship from the surface, a sound projecting surface (42) positioned parallel to the oscillator (48) and facing the second end wall, and means (50, 52, 54) for mismatching the characteristic impedance of the oscillator (48) and the carrier (44), and means (56, 58, 60, 62) for matching the impedance between the oscillator and the sound projecting surface (42);

receiving the group (M) of measurement oscillations at the first wall after reflection in the vicinity of the oppositely disposed second wall for measurement of the elapsed travel time of the oscillations between transmitting of the group (S) of ultrasonic oscillations and the receipt of the group (M) of measurement oscillations to establish a measure of the relative distance;

establishing a reference path (42, 66) of a prescribed length within the fluid medium of the cylinder chamber (26) with a reflection surface (66) at one end of the path;

transmitting a group of ultrasonic oscillations along the reference path from a first end for reflection at the surface (66) at the opposite second end;

receiving the oscillations reflected from the reference reflection surface (66) as a group (R) of reference oscillations at the first end;

measuring the elapsed travel time ($T_R$) between the transmission and receipt of the ultrasonic oscillations along the reference path at the first end (42) and producing a reference signal proportional to the elapsed time; and establishing the relative distance between the cylinder and piston by modifying the measurement of the elapsed time of the group (M) of measurement oscillations in accordance with the reference signal as compensation for the influence of different propagation conditions within the cylinder chamber.

2. A method according to claim 1 wherein the steps of transmitting the group (S) of ultrasonic oscillations from the first end wall toward the second end wall for reflection of group (M) of measurement oscillations and detection of the actual travel time (T) of the measurement oscillations and the step of transmitting the ultrasonic oscillations along the reference path for reflection at the surface (66) and detection of a reference travel time are performed simultaneously so that a group (R) of reference oscillations and a group (M) of measurement oscillations are received in the region of the first end wall (24) one after the other.

3. A method according to claim 1 wherein the steps of transmitting the group (S) of ultrasonic oscillations and receiving the group (M) of measurement oscillations are both performed by the ultrasonic converter.

4. A method according to claim 3 wherein the step of receiving the group (R) of reference oscillations is also performed by the ultrasonic converter.

5. An apparatus for determining the relative distance between a cylinder (12) and a piston (14) of a piston and cylinder assembly (10) that defines a cylinder chamber (26) filled with a fluid medium, the end walls (24, 28) of the cylinder being formed by the cylinder head (12) and the piston (14) comprising:

electrical ultrasonic converter means (30) supported at the first end wall (24) of the cylinder chamber (26) for transmitting a group (S) of ultrasonic oscillations in the direction of the second wall (28) of the cylinder chamber (26) upon excitation by means of electrical excitation pulses ($i_1$, $i_3$), and also producing a corresponding electrical output signal upon impingement of ultrasonic oscillations, the converter including an incompressible carrier (44) having a flat surface (46), a plate-shaped piezoelectric oscillator (48) positioned parallel to the flat surface (46) of the carrier (44), and positioned in the cylinder chamber (26) in spaced relationship from the surface (46), a sound projecting surface (42) positioned parallel to the oscillator (48) and facing toward the second end wall (28) that is in contact with the fluid medium, the projecting surface preferably being formed from the same outer surface as one side of the oscillator (48), and means (50, 52, 54) for mismatching the characteristic impedance of the oscillator (48) and the carrier (44), and means (56, 58, 60, 62) for matching the impedance between the oscillator and the sound projecting surface (42), electrical pulse generating means (94) coupled with the output of the converter means (30), means defining a reference path (42, 66) extending through the fluid medium that is employed in the cylinder chamber (26), and including at a second end opposite the first end a reference wave reflecting surface (66) for reflecting ultrasonic oscillations;

means for transmitting a group (S) of ultrasonic oscillations from the one end of the reference path toward the reflecting surface at the second end; and detection circuit means (34) including means for measuring the travel time of the oscillations through the cylinder chamber between the leading edge of an excitation pulse ($i_1$, $i_3$) and the occurrence of a corresponding group (M) of measurement oscillations in an output signal of the converting means, and also for measuring the actual reference travel time ($T_R$) of the ultrasonic oscillations transmitted and reflected along the reference path (42, 66), and further including calculating means (38) for modifying the measurement oscillation travel time in accordance with the departure of the actual reference travel time ($T_R$) from a pre-established reference travel time to establish the true relative distance between the piston and cylinder.

6. Apparatus according to claim 5 wherein the sound reflecting surface (42) of the converter is a flat sound reflecting surface (42) associated with one of the two end walls (24) in contact with the fluid medium, and the reflecting surface (66) of the reference path is positioned at a pre-established minimal distance from the converter (30) in comparison to the variable distance of the second end wall (28) from the first end wall (24), the reference reflecting surface having a perpendicular deviating by a minimal amount from the perpendicular of the sound reflecting surface (42) of the converter, and being smaller than the sound reflecting surface (42) so that a group (R) of reference oscillations and thereafter a group (M) of measurement oscillations are received by the converter after a group (S) of ultrasonic oscillations are transmitted simultaneously along the reference path and through the cylinder chamber from the converter, the groups appearing in an output signal of the converter sequentially in timed relationship.

7. An apparatus according to claim 6 wherein the converter produces at its output a filtered, amplified, and amplitude regulated signal; and wherein a first threshold circuit (108) is connected to the converter to receive the output signal, and has a trigger point set at the zero crossing point of its input signal; means are provided for detecting the presence of the group (R) of reference oscillations and the group (M) of measurement oscillations in the output signal of the converter (30) for measuring the actual reference travel time ($T_R$) and the travel time (T) of measurement oscillations to determine the end of the travel times ($T_R$, T) in response to the changing condition of the output signal (D) of the first threshold circuit means (108) in response to the detection of the groups (R, M) of reference and measurement oscillations respectively.

8. Apparatus according to claim 7 characterized in that the means 112 for detecting the presence of the group (R) of reference oscillations in the group (M) of measurement oscillations in the output signal of the converter includes circuit means (114, 116) for rectifying and preferably squaring the output signal of the converter, an integrator (118), preferably a zero error integrator, connected with the output of the circuit means (116), and a second threshold circuit (120) connected with the output of the integrator and providing an output signal (G) when the results of the integration (F) exceed a pre-established threshold ($w_0$), and logic coupling means connected with the first threshold circuit (108) for rendering effective only those changes in condition of the output signal utilized for marking the end of the travel times ($T_R$, T) after several successive changes in condition of the output signal (D) from the first threshold circuit (108) which changes have a predetermined time relationship with respect to the output signal (G) of the second threshold circuit, preferably the changes in condition occurring with the zero crossing at the end of the trailing edge of the second half wave ($I_{2R}$, $I_{2M}$) of the groups (R, M) of reference and measurement oscillations respectively.

9. Apparatus according to claim 8 further including an amplifying means (110) disposed in a signal transmission path (102, 110, 112) between the converter (30) and the second threshold circuit (120) and interconnected preferably with the circuit (114, 116) for rectifying and having a controlled amplification, a third threshold circuit (122) with an input connected in parallel with the input of the second threshold circuit (120) and providing an output signal (K) when a relatively higher second value ($w_1$) of the integration results (F) exceeds the threshold value ($w_0$) of the second threshold circuit (120), means (38) for measuring the time durations ($t_2-t_1$; $t_4-t_3$) between the output signals (G, K) of the second and third threshold circuits (120, 122) and means (38, 124) for regulating the degree of amplification of the controlled amplifier (110) as stabilization of said durations.

10. Apparatus according to claim 9 further including program transmitter means (124) connected to the controllable amplifier (112) and having a stored program holding the amplification at a constant value during a time period ($T_3$) comprehending the occurrence of the group (R) of reference ocillations, and subsequently increasing the amplification progressively from a small value corresponding to the constant value in an exponential manner, and means for controlling the degree of amplification to cause the program transmitting means (124) to modify the output signal controlling the amplification.

11. Apparatus according to claim 5 wherein the means for matching impedance includes at least a quarter wave plate (50, 54) having a wave impedance several times smaller than the wave impedance of the oscillator (48) and preferably composed of two such plates (50, 54) with an interposed quarter wave plate (52) having a substantially higher characteristic impedance and the means for matching the characteristic impedance comprises a plurality of quarter wave plates (56, 58, 60, 62) having characteristic impedances lying between that of the oscillator and the fluid medium and decreasing in a stepped manner with one of the plates (58) lying at or near the beam projecting surface (42) being formed from a material suitable for manufacturing circuit boards and fixed means (30) for providing a reference reflection surface (66).

* * * * *